United States Patent [19]

Uehara et al.

[11] Patent Number: 5,252,900
[45] Date of Patent: Oct. 12, 1993

[54] HARMONIZATION CONTROL SYSTEM FOR PLURAL SHAFTS

[75] Inventors: Shinichiro Uehara; Yasuhiro Yuasa, both of Tokyo, Japan

[73] Assignee: Kabushiki Kaisha SG, Tokyo, Japan

[21] Appl. No.: 634,691

[22] Filed: Dec. 27, 1990

[30] Foreign Application Priority Data

Dec. 31, 1989 [JP] Japan .................... 1-341299

[51] Int. Cl.$^5$ .............................................. G05B 19/02
[52] U.S. Cl. ............................ 318/568.11; 318/573; 318/49
[58] Field of Search ......................... 318/43–89, 318/560–630; 364/474.01–474.29

[56] References Cited

U.S. PATENT DOCUMENTS

| | | | |
|---|---|---|---|
| 4,201,937 | 5/1980 | Irie | 318/573 |
| 4,262,336 | 4/1981 | Pritchard | 318/573 |
| 4,420,812 | 12/1983 | Ito et al. | 318/573 |
| 4,445,184 | 4/1984 | Noguchi | 318/568 |
| 4,513,379 | 4/1985 | Wilson et al. | 364/474 |
| 4,629,956 | 12/1986 | Nozawa et al. | 318/625 |
| 4,631,689 | 12/1986 | Arimura et al. | 318/562 |
| 4,815,013 | 3/1989 | Schmidt | 318/49 |
| 5,019,763 | 5/1991 | Komatsu | 318/571 |
| 5,025,200 | 6/1991 | Kurakake et al. | 318/569 |
| 5,038,090 | 8/1991 | Kawabata et al. | 318/721 |

*Primary Examiner*—Paul Ip
*Attorney, Agent, or Firm*—Graham & James

[57] ABSTRACT

Drive control units are provided each for one of plural drive shafts for controlling driving of the drive shaft in response to an individually imparted set value. A state parameter generation section generates, for each of the drive shafts, a parameter representing a state concerning a predetermined object of harmonization control among drive control states of the respective shafts produced by the drive control units. As the object of harmonization control, a desired factor may be selected depending upon necessity for the harmonization control. A position loop gain or a velocity loop gain, for example, may be selected as the object of harmonization control. A reference parameter generation section generates, responsive to the generated parameter representing the drive control state of each drive shaft, a reference parameter to be used as a reference of the harmonization control. The drive control state of each drive shaft in each of the drive control unit is corrected in response to the generated reference parameter. In the drive control unit, driving of each shaft is controlled individually in response to a set value which is individually imparted but, by correcting the drive control state in response to the reference parameter, the drive state of each shaft is harmoniously controlled in response to the reference parameter whereby a control for harmonizing the movements of an extremely large number of drive shafts can be realized.

27 Claims, 7 Drawing Sheets

HARMONIZATION CONTROL SYSTEM FOR PLURAL SHAFTS

BACKGROUND OF THE INVENTION

This invention relates to a harmonization control system for performing a control for harmonizing movements of plural shafts and, more particularly, to a novel harmonization control system capable of performing a control for harmonizing movements of an extremely large number of shafts such as hundreds of shafts.

Among industrial machines employing a servo system such as robots, there is one which controls movement of an object of control by cooperative movements of plural shafts. When, for example, an object of control (e.g., an arm of a robot) is moved in two dimensions, a two-shaft servo control is performed and when it is moved in three dimensions, a three-shaft servo control is performed. In this case, a synchronization control is made for controlling a two-dimensional or three-dimensional locus of movement of the object of control. In other words, a control is made for synchronizing movements of plural shafts at each moment so that a desired locus will be produced by cooperation of the respective shafts.

In a synchronization control, however, a desired multi-dimensional locus of movement such as two-dimensional or three dimensional locus of movement must be subjected to vector analysis for computing an expected movement pattern of each shaft. This requires an extremely complicated control with resulting limitation in the number of shafts which can be synchronously controlled. That is, it is only possible to synchronously control three shafts at most.

With a robot having a large number of arms, there is a case where movements of these arms are desirably controlled in association or harmonization with one another. As movements of a robot become more and more elaborate or complicated, such demand for associated or harmonized movements of arms is expected to grow stronger and stronger from now on. In not only robots but also in a production line having a large number of actuators which are desirably moved in association or harmonization with one another, it is desirable to control these large number of actuators in association or harmonization with one another. Also, in theaters, various stage settings such as rising stage and a curtain have come to be servo-driven by actuators. In this case, it is desirable to control a large number of actuators for moving these stage settings in association or harmonization with one another, because an excellent stage effect will be produced if these large number of actuators are controlled properly in association or harmonization with one another in accordance with a certain factor.

The conventional synchronization control method does not give an effective solution to such demand, since, as described above, the number of shafts which can be synchronously controlled is limited to a very small number. In the newest theater, for example, hundreds of actuators are provided and it is utterly impossible to achieve synchronized movements of these hundreds of actuators by the conventional synchronization control method.

It is theoretically possible to prepare programs of movement patterns of respective shafts so that the respective shafts move in synchronization with one another in a desired mutual relation and cause these shafts to be moved synchronously by performing a control for driving the respective shafts in accordance with these programs. In a case, however, where the number of shafts to be controlled synchronously amounts to several hundreds, it is almost impossible to program respective movement patterns so that movements of the respective shafts will correlate with one another having regards to all mutual relations of these shafts. Even if it is possible at all, such programming will require tremendous amount of work and cost and will not pay in terms of the cost.

Besides, loop gains of control loops in drive control units of respective shafts differ from one another and vary from time to time due to difference in load condition among the respective shafts and timewise variation in load condition of the respective shafts. However, the control according to the movement patterns programmed as desired, per se, cannot cope with such difference or variation in loop gains.

SUMMARY OF THE INVENTION

It is, therefore, an object of the invention to provide a novel harmonization control system for plural shafts which is capable of harmonizing movements of plural, particularly a large number of drive shafts amounting to several hundreds.

The harmonization control system for plural shafts according to the invention comprises plural drive shafts, drive control units each provided for one of the drive shafts for controlling driving of the drive shaft in response to an individually imparted set value, a state parameter generation section for generating, for each of the drive shafts, a parameter representing a state concerning a predetermined object of harmonization control among drive control states of the respective shafts produced by the drive control units, a reference parameter generation section for generating, responsive to the parameter representing the drive control state of each drive shaft generated by the state parameter generation section, a reference parameter to be used as a reference of the harmonization control, and a correction section for correcting the drive control state of each drive shaft in each of the drive control unit in response to the reference parameter, the respective drive shafts being harmoniously controlled in response to the reference parameter owing to this correction.

The drive control unit is provided for each of plural drive shafts and this drive control unit controls driving of the corresponding shaft in response to an individually imparted set value. A parameter representing a state concerning a predetermined object of harmonization control among drive control states of the respective shafts produced by the drive control units is generated by the state parameter generation section. A reference parameter to be used as a reference of the harmonization control is generated by the reference parameter generation section in response to the generated parameter representing the drive control state concerning the object of harmonization control. The correction section corrects the drive control state of the respective shafts in the respective drive control units in response to the generated reference parameter.

Each shaft is individually driven by the control by the drive control unit in response to an individually imparted set value. Since its drive control state is corrected by the correction section in response to the reference parameter, the drive control state of each shaft is harmoniously controlled in response to the reference parameter. For being used as a reference of the harmonization control, the reference parameter is generated in response to the parameter representing the drive control state of each shaft concerning the object of harmonization control. Accordingly, by correcting the drive control state of each shaft in response to this reference parameter, the drive control state of each shaft concerning the object of harmonization control can be harmoniously controlled in response to the reference parameter. As the object of harmonization control, any desired factor may be selected depending upon necessity for the harmonization control. A position loop gain or velocity loop gain, for example, may be selected as the object of harmonization control.

Since, according to the invention, the reference parameter is generated in response to the drive control state of each shaft and the drive control state of each shaft is corrected in response to this reference parameter, a complicated and cumbersome processing program such as subjecting a multi-dimensional locus of movement to vector analysis for each shaft to compute an expected movement pattern for each shaft as in the synchronization control becomes unnecessary. Accordingly, a harmonization control can be performed very easily even in a case where the number of shafts to be harmoniously controlled is very large, e.g., several hundreds. Further, even when the drive control state of each shaft varies due to timewise variation in the load condition of the shaft or difference in the load condition among the shafts, the reference parameter which is generated in response to the drive control state of each shaft varies suitably in accordance with the variation in the drive control state and, accordingly, an optimum harmonization control can be constantly performed.

The harmonization control system according to the invention may be carried out in combination with a synchronization control.

According to another aspect of the invention, a harmonization control system for plural shafts wherein the plural shafts are divided in plural blocks each including one or more drive shafts comprises, for each block, (a-1) a drive control unit provided for each shaft in said block for controlling driving of each shaft in response to an individually imparted set value;

(a-2) a synchronization control unit for controlling the set value imparted to each drive control unit so that movements of the respective shafts are synchronized in accordance with a predetermined synchronization condition; and (a-3) a state parameter generation section for generating a parameter representing a representative drive control state concerning a predetermined object of harmonization control in said block, (b) said system further comprises a reference parameter generation section for generating, responsive to parameters representing representative drive control states in the respective blocks generated by said state parameter generation section, a reference parameter to be used as a reference of the harmonization control, and (c) said system further comprises, for each block, a correction section for correcting the drive control states of the respective shafts in said block in response to the generated reference parameter, movements of the respective shafts being synchronously controlled by said synchronization control unit in one block and being harmoniously controlled among all of the blocks in response to the reference parameter by correction by said correction section.

A synchronization control can be performed on the block basis, each block including one or more (a relatively small number to the extent that a synchronization control can be performed) drive shafts, and a plurality of such blocks are provided. The harmonization control according to the invention is carried out among these blocks. By this arrangement, the drive shafts which amounts to a large number as a whole can be controlled harmoniously while they are controlled synchronously on the block basis whereby the harmonization control of a large number of shafts amounting even to several hundreds as a whole can be achieved while a multi-dimensional movement locus control can be performed on the block basis.

All of the drive shafts in the system need not be harmoniously controlled commonly. For example, the respective drive shafts or respective blocks may be divided into plural groups and the harmonization control may be performed group by group.

According to another aspect of the invention, the harmonization control system for plural shafts may further comprise an intervention section which inputs a parameter of a desired value as a dummy parameter. In this case, the reference parameter generation section generates the reference parameter having regards to not only the parameter representing the drive control state of each shaft which has been generated by the state parameter generation section but a dummy parameter which has been input to the intervention section. By determining the dummy parameter suitably as desired, the harmonization control can be performed in response to the dummy parameter. For example, a manual intervention to the system can thereby be realized. Alternatively stated, by inputting a parameter representing a desired drive control state by the intervention section as the dummy parameter and generating the reference parameter in response to this dummy parameter, the harmonization control responsive to the dummy parameter can be performed. This arrangement is useful when the operation state of the entire system should be changed immediately, e.g., the operation of the entire system should be accelerated or decelerated quickly. In a case, for example, where the operation of the entire system should be accelerated quickly when the parameter representing the drive control state is a loop gain of the servo control system, data indicating a large loop gain is applied as the dummy parameter and a parameter indicating the largest loop gain is selected as the condition for generating the reference parameter. The dummy parameter indicating the large gain thereby is selected as the reference parameter and the servo control loop gain of the respective shafts is harmoniously controlled in response to this dummy parameter. In a case where the operation of the entire system should be decelerated, the reverse operation may be performed. When the dummy parameter has been applied, it may be preferentially selected as the reference parameter. A manual intervention processing by such dummy parameter is useful when a desired harmonization state should be realized promptly.

In still another aspect of the invention, a harmonization control system for plural shafts wherein one block comprises said drive control units of a number $n+a$ (where n and a are respectively integers 1 or over) which is larger than number n of the shafts in said block by a, may comprise a switching circuit between these n+a drive control units and actuators corresponding to the n shafts, enables desired n drive control units by a selection signal and connects the desired n drive control units which have been enabled to the n actuators through said switching circuit.

In this case, the extra a drive control units can be used as spare units for backup purposes. In other words, when a malfunction has occurred in the drive control unit in use, the unit can be separated by a switching operation by the switching circuit and the spare drive control unit can be instantly connected to replace the malfunctioning unit, so that the drive control can be continued without stopping.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 1:
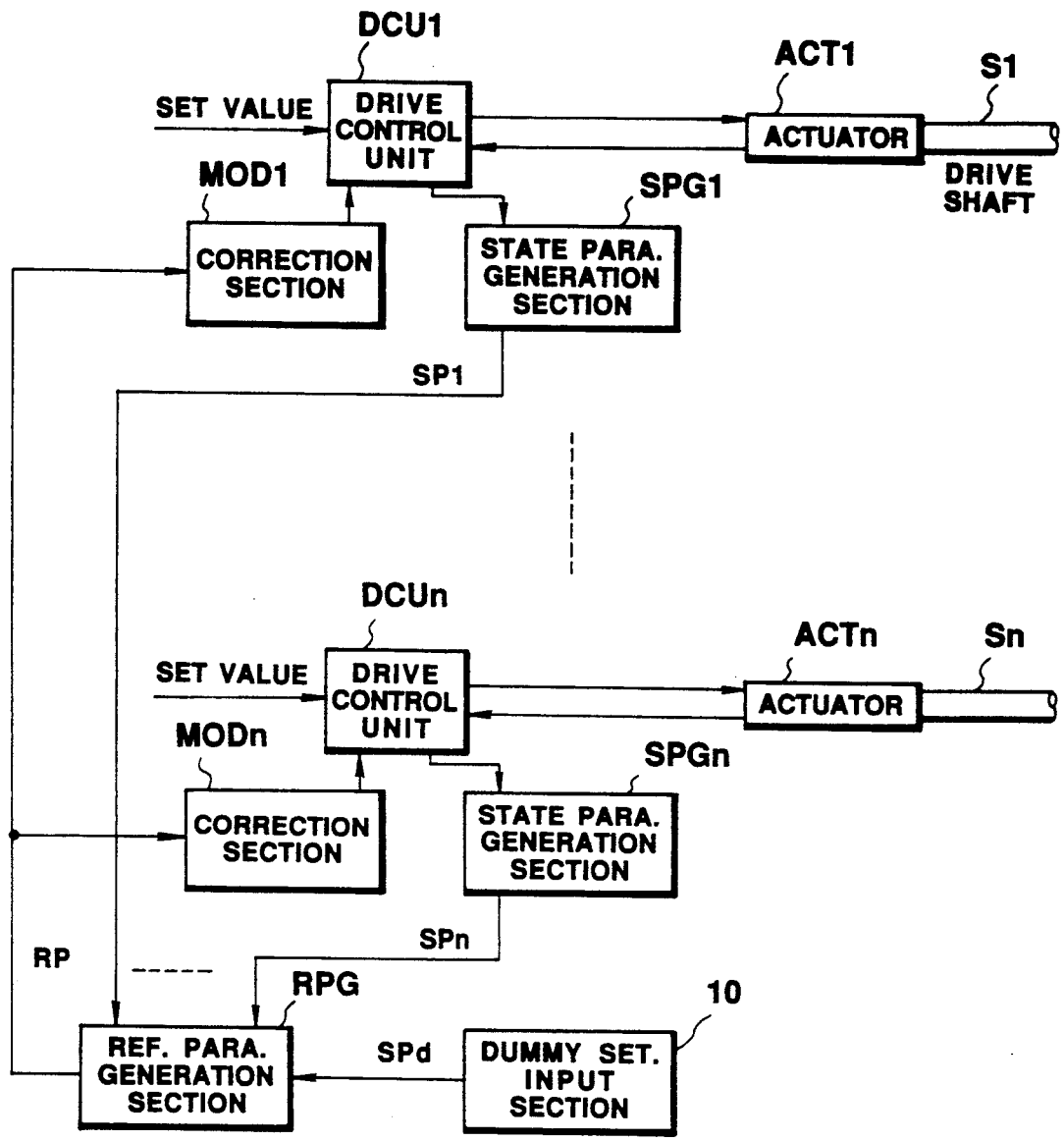
FIG. 1 is a block diagram showing an embodiment of the basic system of the invention.

FIG. 1 is a block diagram showing an embodiment of the basic system of the invention. Drive control units DCU1 to DCUn are provided in correspondence to n drive shafts S1 to Sn. Each of the drive control units DCU1 to DCUn controls driving of its corresponding shaft in response to an individually imparted set value and may be in the form of a servo control unit or other suitable positioning control unit consisting of a different control system. The form of a set value imparted to each of the drive control units DCU1 to DCUn may be suitably determined on the basis of the construction of the drive control unit. For example, the set value may be a positioning target value, an instantaneous moved position command value according to the movement pattern which has been separately prepared, or a velocity command value. Outputs of the drive control units DCU1 to DCUn are imparted to actuators ACT1 to ACTn to drive them and thereby to drive shafts S1 to Sn connected to these actuators ACT1 to ACTn. The actuators ACT1 to ACTn may be of a rotational type or a linear displacement type. The actuators ACT1 to ACTn may also be of an electric motor type or other type. In the case of an electric motor type actuator, it may be of any motor, e.g., an AC servo motor, a DC servo motor or an induction motor.

State parameter generation sections SPG1 to SGPn generate parameters SP1 to SPn representing a state of a predetermined object of harmonization control among drive control states of the shafts S1 to Sn by the drive control units DCU1 to DCUn. The type of the parameters generated here corresponds to the object of harmonization control. When, for example, a harmonization control of a moving time or a moving velocity is to be made by harmoniously controlling a loop gain in the servo control among shafts, current values of the loop gain in the servo control in the drive control units DCU1 to DCUn are detected by utilizing feedback information of position and/or velocity from the actuators ACT1 to ACTn and data corresponding to the detected loop gain are provided as the parameter SP1 to SPn representing the drive control states concerning the object of harmonization control. The servo loop gain which is the object of harmonization control may be a position loop gain or velocity loop gain. The harmonization control herein means a control in which, not like a synchronization control in which movement patterns of respective shafts are closely related to one another, movements of respective shafts are harmonized in a relatively loose association by performing a harmonious control among the shafts with respect to at least a factor which is the object of harmonization control.

A reference parameter generation section RPG generates, responsive to the parameters SP1 to SPn representing drive control states of the respective shafts which have been generated by the state parameter generation sections SPG1 to SPGn, a reference parameter RP to be used as a reference in the harmonization control. The manner of generating the reference parameter RP may be determined suitably depending upon the purpose of the control. For example, one parameter may be selected from among the parameters SP1 to SPn representing the drive control states of the respective shafts in accordance with a predetermined reference and the selected parameter may be provided as the reference parameter RP. The reference of selection may be selected, for example, by selecting a maximum value or a minimum value. Alternatively, a predetermined operation may be made by using the parameters SP1 to SPn representing the drive control states of the respective shafts as variables and result of this operation may be provided as the reference parameter RP. For example, an operation for computing an average value of the parameters SP1 to SPn may be made and the computed average value may be used as the reference parameter RP. As the reference parameter condition, one of the above described maximum value selection, minimum value selection and average value computation may be selected as desired.

Correction sections MOD1 to MODn provided in correspondence to the respective drive control units DCU1 to DCUn correct and change the drive control states concerning the object of harmonization control in the drive control units DCU1 to DCUn. For the correction and change, the concept of the master-slave control system, for example, is basically adopted. That is, the reference parameter RP is used as master information and a slave control is made so that the object factor of harmonization control of the respective shafts will harmonize with the contents of the master information. For example, servo loop gains of the drive control units DCU1 to DCUn are respectively corrected and changed so that the loop gains will correspond to the loop gain determined in accordance with the reference parameter RP.

In this manner, the respective shafts S1 to Sn are harmoniously controlled in response to the reference parameter RP. When, for example, a maximum value of loop gain has been selected as the reference parameter RP, control of shafts is accelerated in conformity with a specific shaft for which control is most advanced. When a minimum loop gain has been selected as the reference parameter RP, control of shafts is decelerated in conformity with the shaft for which control is most delayed. In a case where an average value of servo loop gains of the respective shafts has been provided as the reference parameter RP, control of the respective shafts is accelerated or decelerated in conformity with the average value.

Figure 2:
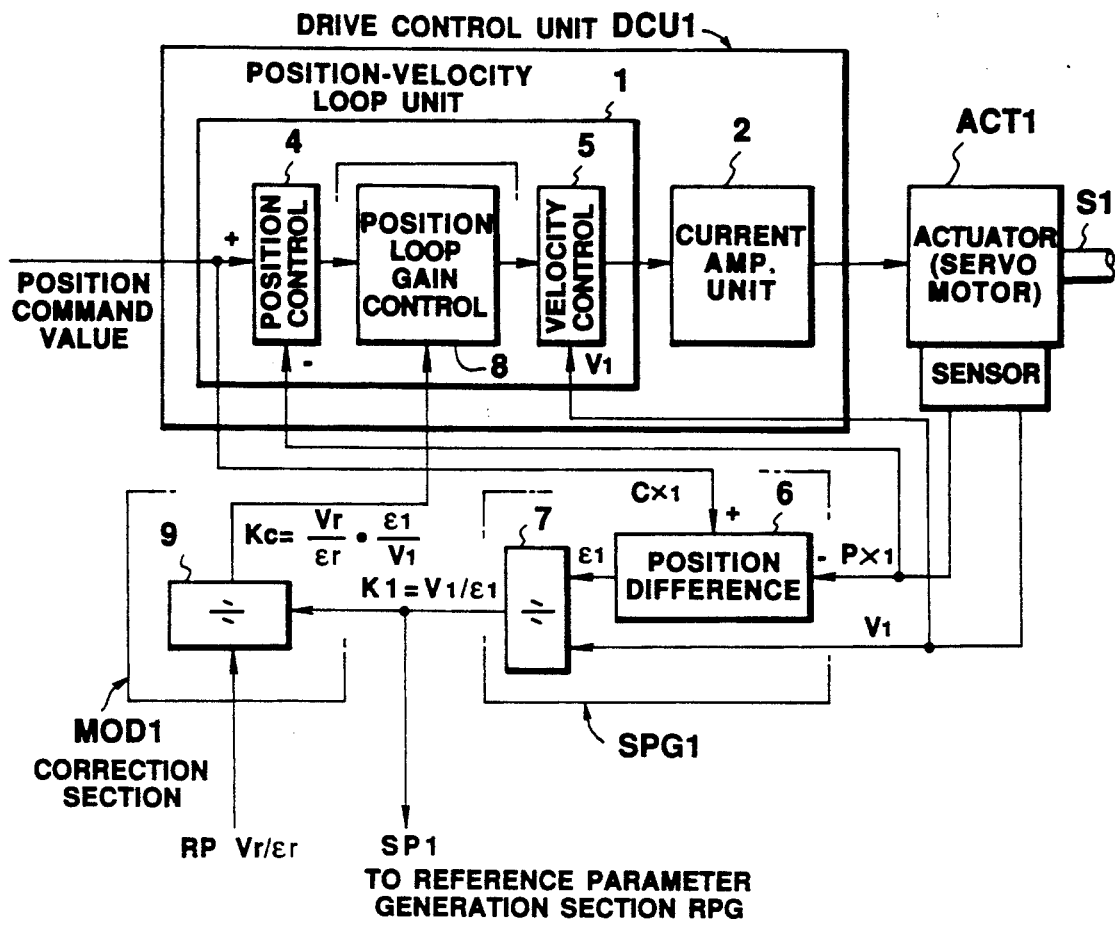
FIG. 2 is a block diagram showing an example of the drive control unit, state parameter generation section and correction section with respect to one shaft.

FIG. 2 shows, with respect to one shaft only, an example of the drive control unit DCU1, the state parameter generation section SPG1 and the correction section MOD1 in a case where a position loop gain in servo control is made the object of harmonization control. The drive control unit DCU1 consists of a servo control unit and includes a position-velocity loop unit 1 and a current amplifier unit 2. The actuator ACT1 is a servo motor. A sensor 3 is provided for detecting a current position Px1 and velocity v1 of the shaft S1 and feeding back the detected data. There are various ways for giving a position command value Cx1. By way of example, description will be made on the assumption that data representing an absolute value of current moved position has been given in accordance with a separately prepared movement pattern. It is also assumed that the current position Px1 detected by the sensor 3 is an absolute value.

In the drive control unit DCU1, as conventionally known, a servo control is made so that the current position Px1 will follow up the momentarily changing position command value Cx1. More specifically, a position control section 4 computes difference Cx1-Px1 between the position command value Cx1 and the current position Px1 which is fed back from the sensor 3 and supplies this difference to a velocity control section 5. The velocity control section 5 produces control data in response to the position difference supplied from the position control section 4 and the current velocity v1 fed back from the sensor 3. The current amplifier unit 2 controls the drive current for the actuator ACT1, i.e., the servo motor, in response to the control data supplied from the velocity control section 5. In a case where the position command value Cx1 and other data are given in digital data, a digital-to-analog converter (not shown) is provided at a proper location.

The state parameter generation section SPG1 includes a position difference operation section 6 which computes difference $Cx1-Px1=\epsilon 1$ between the position command value Cx1 and the current position Px1 which is fed back from the sensor 3 and a division section 7 which divides the current velocity v1 fed back from the sensor 3 by this position difference $\epsilon 1$ (or may be divided in the other way). The state parameter generation section SPG1 detects the position loop gain in the servo control loop of the shaft S1.

Figure 3:
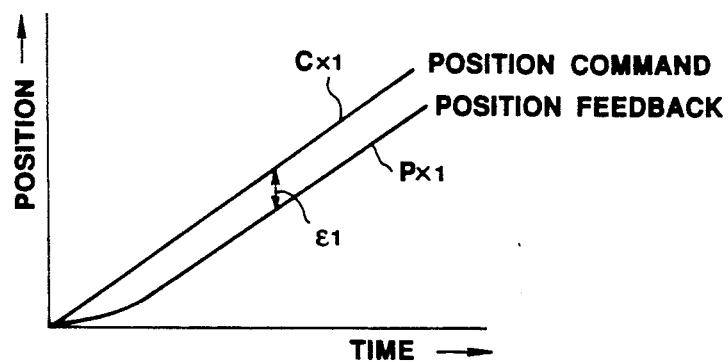
FIG. 3 is a graph showing an example of timewise change in the position command value and current position feedback amount in the example of FIG. 2.

An example of timewise change of the position command value Cx1 and timewise change in the current position feedback amount Px1 is shown in FIG. 3. Difference between these data is the position difference $\epsilon 1$. When, for example, load on the shaft S1 has significantly increased, the velocity loop gain in the servo control loop decreases with a resulting decrease in the position loop gain. As a result, the position difference $\epsilon 1$ increases. In this case, position loop gain K1 can be expressed as $K1 = v1/\epsilon 1$ in response to the velocity v1 and position difference $\epsilon 1$ at that time. Accordingly, the division section 7 detects the position loop gain K1 by dividing the velocity v1 by the position difference $\epsilon 1$.

In the above described manner, the parameter SP1 representing the position loop gain K1 which is the object of harmonization control is generated and supplied to the reference parameter generation section RPG. Likewise, parameters SP2 to SPn representing position loop gains K2 to Kn in the servo loop control of the other shafts S2 to Sn are generated and supplied to the reference parameter generation section RPG. The reference parameter generation sections RPG generates, as described before, the reference parameter RP in accordance with a predetermined reference in response to the state parameters sP1 to SPn of the respective shafts SP2 to SPn. In a case where, for example, a control is made for harmonizing with a shaft about which the position loop gain has decreased most, a minimum position loop gain (designated by vr/$\epsilon$r) is selected from among position loop gains of the respective shafts and is provided as the reference parameter RP=vr/$\epsilon$r.

The correction section MOD1 includes a position loop gain control section 8 which is incorporated in the servo control loop and a division section 9. The division section 9 computes position loop gain correction coefficient Kc by dividing the reference parameter RP=vr/$\epsilon$r generated from the reference parameter generation section RPG by its position loop gain v1/$\epsilon$1. That is, $$Kc = (vr/\epsilon r) \div (v1/\epsilon 1)$$
$$= (vr \cdot \epsilon 1)/(\epsilon r \cdot v1)$$

The position loop gain control section 8 is inserted in the position-velocity loop unit 1 and multiplies, for example, control data corresponding to position difference provided by the position control section 4 with the position loop gain correction coefficient Kc. By this correction of the position loop gain, the original position loop gain K1 of the servo control loop is corrected and becomes K1 Kc. That is, $$K1\ Kc = (v1/\epsilon 1) \cdot (vr \cdot \epsilon 1)/(\epsilon r \cdot v1) = vr/\epsilon r$$

Thus, the corrected position loop gain becomes the position loop gain vr/$\epsilon$r designated by the reference parameter RP.

In the above described manner, a position loop gain of any shaft is controlled so that it becomes, theoretically, the common position loop gain vr/$\epsilon$r designated by the reference parameter RP whereby the harmonization control can be achieved. Alternatively stated, when a control is made so that the position loop gain is harmonized with a shaft about which the position loop gain is the lowest, position loop gains of respective shafts are caused to coincide with it and a control is decelerated in harmonization as a whole. Conversely, when a control is made so that the position loop gain is harmonized with a shaft about which the position loop gain is the highest, position loop gains of respective shafts are caused to coincide with it and a control is accelerated in harmonization as a whole. Likewise, in a case where the control for harmonizing position loop gains of the respective shafts to the average value of the position loop gains of the respective shafts is made, position loop gains of the respective shafts are caused to coincide with the average value and the control of each shaft is accelerated or decelerated so that a control is made so as to harmonize the entire system.

Intervention means such, for example, as a dummy setting input section 10 (FIG. 1) for inputting data representing a position loop gain of a desired value as a dummy parameter SPd may be provided. By applying the input dummy parameter SPd with the position loop gains K1 to Kn generated by the state parameter generation sections SPG1 to SPGn to the reference parameter generation section PRG, a manual intervention in the harmonization control can be realized. In other words, in a case where the control is to be accelerated, a maximum value may be selected as the reference for generating the reference parameter in the reference parameter generation section RPG and the maximum value may be applied as the position loop gain of the dummy parameter SPd. Conversely, in a case where the control is to be decelerated, the opposite processing may be made. Additionally, when the dummy parameter has been applied by the intervention means, the dummy parameter may be preferentially selected as the reference parameter RP. By doing so, the reference parameter RP may be set at a desired value.

When the number n of the shafts is large, it is not convenient to lead the state parameters SP1 to SPn of the respective shafts to the reference parameter generation section RPG through parallel wiring. It is therefore preferable to adopt a construction as shown in FIG. 4.

Figure 4:
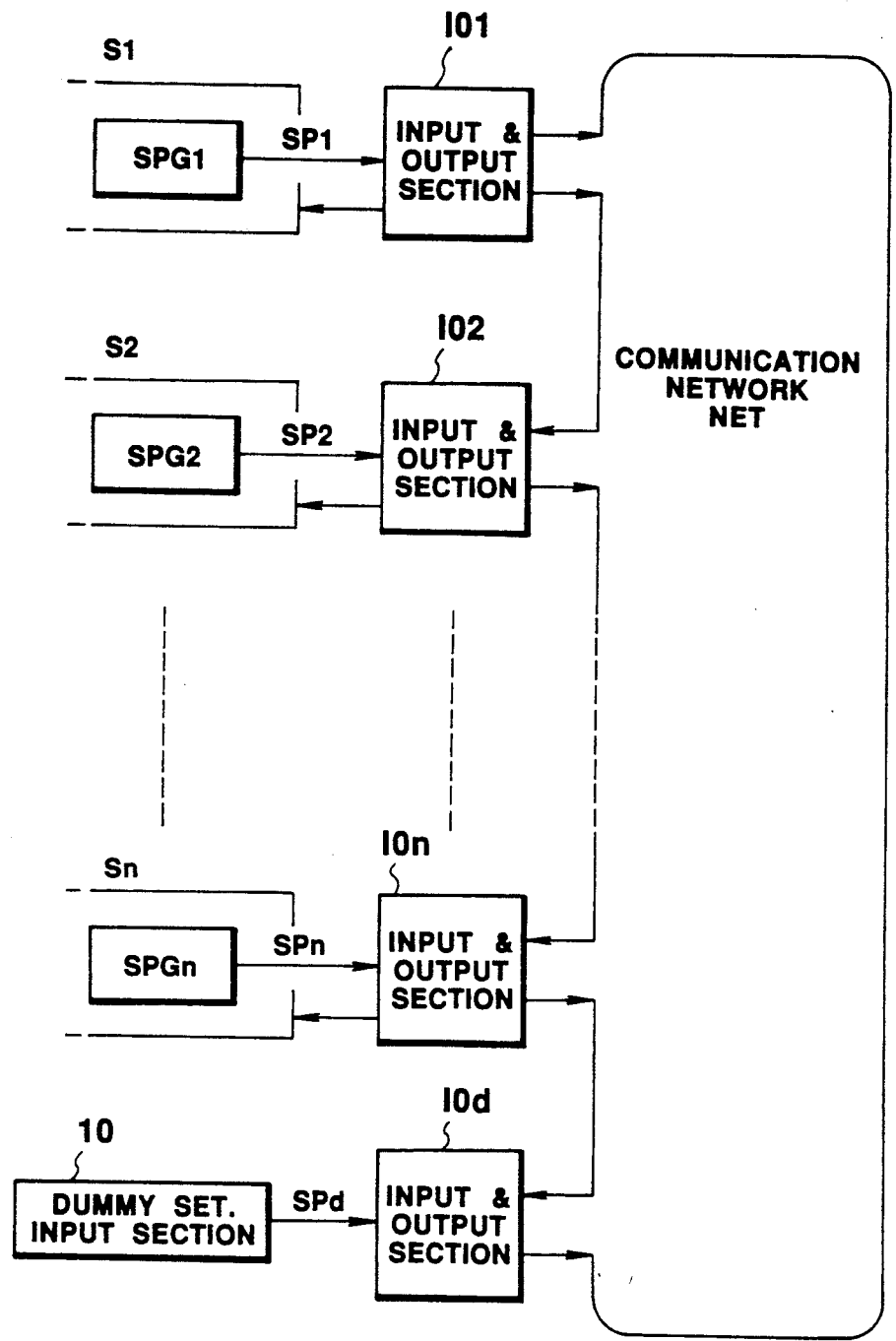
FIG. 4 is a block diagram showing an example of a reference parameter generation section RPG in FIG. 1.

FIG. 4 shows an example of construction of the reference parameter generation section RPG. The reference parameter generation section RPG includes an annular communication network NET and input and output sections IO1 to IOn for the respective shafts S1 to Sn which are serially connected to the annular communication network NET. These input and output sections IO1 to IOn input the parameters SP1 to SP2 representing the drive control states of the corresponding shafts S1 to Sn from the state parameter generation sections SPG1 to SPGn of the corresponding shafts S1 to Sn and also input data supplied from upstream of the communication network NET, selectively performs one of selection of either of the two input data, addition and subtraction, and provides result of the processing to downstream of the communication network. The selection of either of the two data includes selection of a larger or smaller one after comparing the two inputs and compulsory selection of either (e.g., unconditional selection of data supplied from upstream of the communication network NET). The addition and subtraction are performed for computing an average value or other value. Successive processing is made in this manner and, upon completion of one cycle of the ring of the communication network NET, the predetermined maximum value or minimum value detection processing has been completed. The reference parameter RP which has been determined as a result of this processing may be distributed to the control units of the respective shafts S1 to Sn.

In the above described embodiment, the harmonization control according to the invention is made with respect to each shaft. The invention is not limited to this but the harmonization control may be made on the block basis, each block including one or more drive shafts.

Figure 5A:
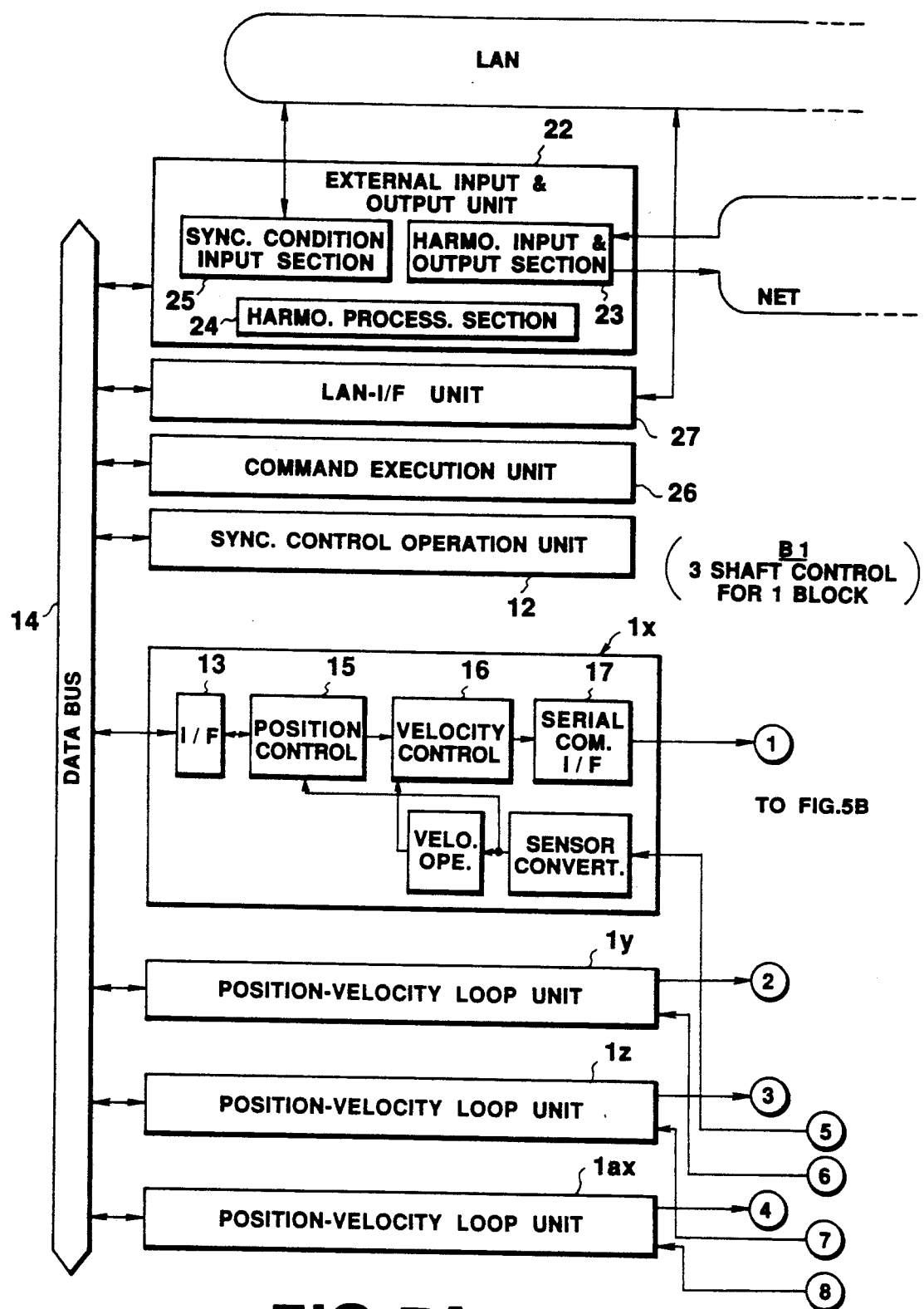
FIGS. 5A and 5B are block diagrams showing another embodiment of the invention.
Figure 5B:
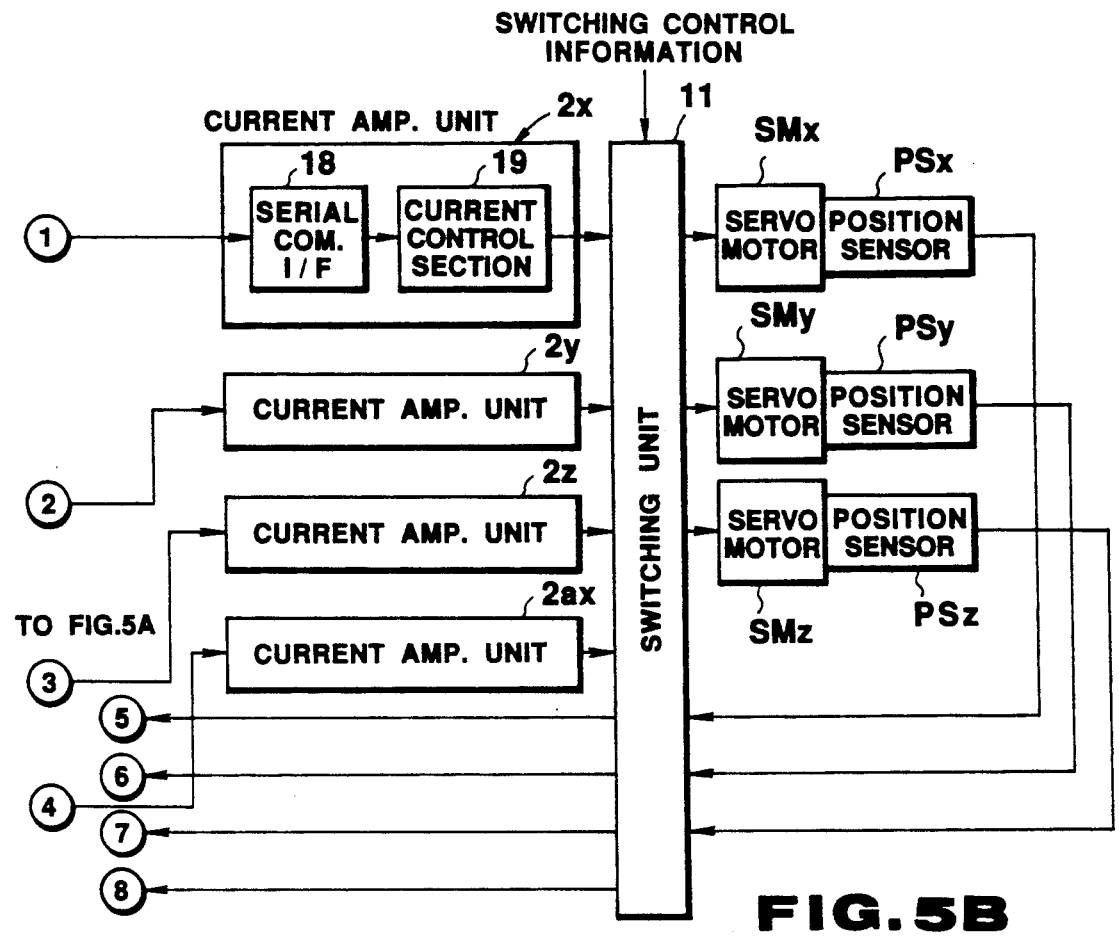

FIGS. 5A and 5B show an embodiment of such block base control and schematically show the basic construction of one block only. In this embodiment, one block includes three drive shafts and a three-dimensional locus control can be realized by synchronously controlling the three drive shafts. For convenience of illustration, FIG. 5A is separated from FIG. 5B but the two figures are connected to each other at connecting points 1 to 8 to illustrate a three-shaft synchronization control circuit for one block.

Description will be made first about the construction of the control circuit in the block. There are provided servo motors SMx, SMy and SMz for each drive shaft and also position sensors PSx, PSy and PSz corresponding thereto. Position-velocity loop units 1x, 1y and 1z and current amplifier units 2x, 2y and 2z which perform substantially the same function as the position-velocity loop unit 1 and the current amplifier unit 2 shown in FIG. 2 are provided in correspondence to the respective shafts. Moreover, a spare position-velocity loop unit 1ax and a spare current amplifier unit 2ax are provided for backup purpose.

A switching unit 11 is provided between the current amplifier units 2x, 2y, 2z and 2ax for four shafts and the servo motors SMx, SMy and SMz for three shafts. In response to switching control information supplied by a higher control device (not shown), outputs of predetermined three current amplifier units 2x, 2y and 2z are connected to the servo motors SMx, SMy and SMz and predetermined position-velocity loop units 1x, 1y and 1z corresponding thereto are enabled. In the event that malfunction has occurred in one of the position-velocity loop units 1x, 1y and 1z or one of the current amplifier units 2x, 2y and 2z, the switching unit 11 switches, responsive to switching control information supplied from a higher control device (not shown), the malfunctioning system to the backup current amplifier unit 2ax and enables the corresponding backup position-velocity loop unit 1ax.

Output signals of the position sensors PSx, PSy and PSz are switched by the switching unit 11 and fed back to predetermined three position-velocity loop units which are currently enabled (any three of 1x, 1y, 1z and 1ax).

In the position-velocity loop units 1x, 1y, 1z and 1ax, an interface 13 receives a position command value (corresponding to Cx1 in FIG. 2), a loop gain correction coefficient responsive to the reference parameter (corresponding to Kc in FIG. 2) and other necessary data supplied through a data bus 14 and delivers out necessary data including current position data detected by the position sensor to the data bus 14. A position control section 15 corresponds to the position control section 4 and the position loop gain control section 8 in FIG. 2 and performs an operation for obtaining position difference and also an operation for correcting the loop gain in response to the loop gain correction coefficient. A velocity control section 16 corresponds to the velocity control section 5 in FIG. 2. Control data produced by the velocity control section 5 is supplied to the corresponding current amplifier unit 2x through serial communication interfaces 17 and 18. Detailed description of this processing will be omitted. Alternatively, the control data may be supplied to a current control section 19 in the current amplifier unit 2x without providing the serial communication interfaces 17 and 18.

In this embodiment, sensors of a type which produces an output obtained by phase-shifting an ac signal in accordance with the position are used as the position sensors PSx, PSy and PSz (e.g., sensors disclosed in Japanese Patent Publication No. 62-58445) and, accordingly, a sensor conversion section 20 is provided for measuring the amount of phase shift and converting it to position data. The manner of obtaining position data is of course not limited to this. Velocity is obtained by computing timewise change in the position data by a velocity operation section 21. The manner of computing velocity is not limited to this.

The synchronization control operation unit 12 is provided for performing a three-dimensional locus control by synchronously controlling three drive shafts. More specifically, the synchronization control operation unit 12 subjects a desired three-dimensional locus produced by timewise change in one object of positioning which is controlled in its position by cooperation of the three drive shafts to vector analysis in respect of position and velocity of each shaft, and prepares a movement pattern for each shaft on the basis of the vector analysis. The unit 12 further generates a position command value (corresponding to Cx1 in FIG. 2) in accordance with this position command value and supplies it to three position-velocity loop units (any three among 1z, 1y, 1z and 1ax) through the data bus 14. Since such synchronization control by vector control per se is well known, detailed description thereof will be omitted. As this synchronization control operation unit 12, a synchronization control system as disclosed in Japanese patent Application No. 1-216136 (corresponding to U.S. patent application Ser. No. 07/565,268 and European Patent Application No. 90,115,209.0) may be employed.

An external input and output unit 22 is provided for exchanging data between this particular block and other devices (i.e., a higher control device and other blocks). A harmonization input and output section 23 and a harmonization processing section 24 perform functions substantially corresponding to those of the input and output section IO of the reference parameter generation section RPG shown in FIG. 4. Specifically, an annular communication network NET is provided for generating the reference parameter. The harmonization input and output sections 23 of the respective blocks are connected serially to the communication network NET and receive data supplied from upstream. The harmonization processing section 24 compares or operates this data with the representative state parameter of its block (e.g., data representing the representative loop gain of its block) and provides result of the comparison or operation from the harmonization input and output section 23 to supply it to the downstream blocks. The harmonization processing section 24 performs not only the above described function of the reference parameter generation section RPG but also function of the state parameter generation section.

Figure 6:
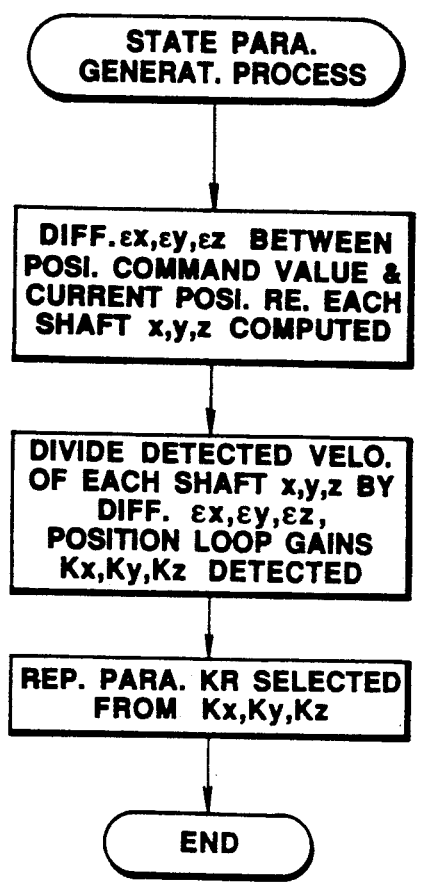
FIG. 6 is a flow chart showing an example of a state parameter generation processing executed by the device shown in FIGS. 5A and 5B.
Figure 7:
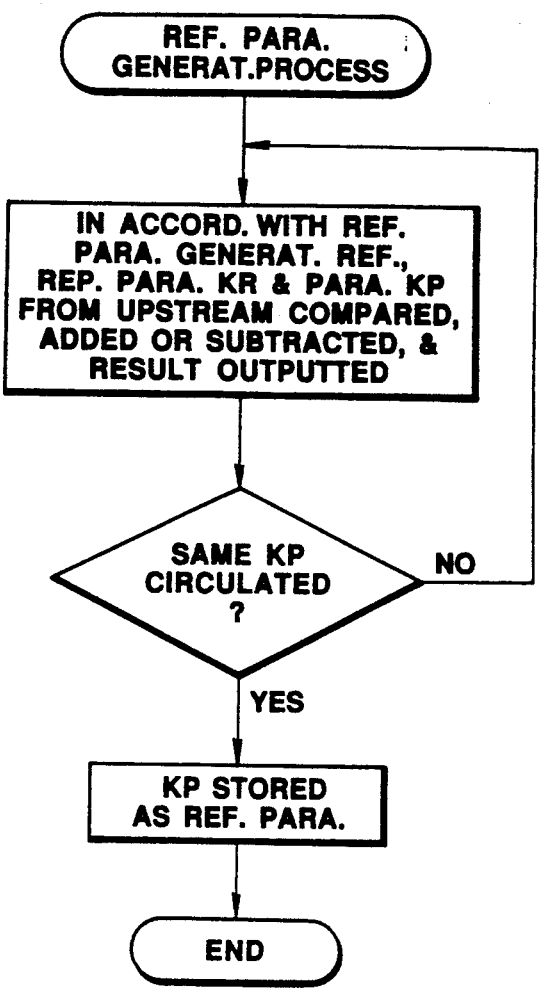
FIG. 7 is a flow chart showing an example of a reference parameter generation processing executed by the device shown in FIGS. 5A and 5B.

The processing in the harmonization processing section 24 is executed by a microcomputer. Flows of this processing are schematically shown in FIGS. 6 and 7.

First, processing for generating the state parameter will be described with reference to FIG. 6. By computing position differences $\epsilon x$, $\epsilon y$ and $\epsilon z$ between the position command value and the current position with respect to each of three shafts x, y and z and dividing detected velocity of each corresponding shaft by a corresponding one of the position differences $\epsilon x$, $\epsilon y$ and $\epsilon z$, position loop gains Kx, Ky and Kz of the respective shafts are detected. Then, one of these position loop gains Kx, Ky and Kz which represents the particular block is selected. The reference for selecting this representative loop gain may be determined as desired. For example, this reference may be the same as the reference for generating the reference parameter (i.e., maximum value, minimum value or average value).

The processing for generating the reference parameter will now be described with reference to FIG. 7. First, in accordance with a predetermined reference for generating the reference parameter, the representative state parameter of its block which has been selected by the processing of FIG. 6, i.e., position loop gain (designated by KR) and state parameter (designated by KP) supplied from upstream of the communication network NET are compared with each other or added together or subtracted therebetween. The result of the comparison, addition or subtraction is provided from the harmonization output section 23 to the downstream block through the communication network NET. This processing is the same as the one which has been described with reference to FIG. 4. Whether or not the same state parameter KP has completed one circulation through the communication network NET is examined and, when the answer is YES, this means the reference parameter so that it is stored inside. In other words, when the same state parameter KP has completed one circulation through the communication network NET, it means that the state parameter KP is a maximum value or minimum value or that an average value has been established. In the case of computing the average value, suitable processing is made to perform the addition or subtraction only once in order to prevent unnecessary repetition of addition or subtraction. The selection of a maximum value, minimum value or average value may preferably be made as desired.

The manner of correction of position loop gain of each shaft in response to the reference parameter may be the same as the previously described embodiment. That is, the reference parameter is divided by position loop gain of its shaft and position loop gain correction coefficient is computed for each shaft and the position loop gain is corrected or changed by this correction coefficient in the position control section 15.

Figure 8:
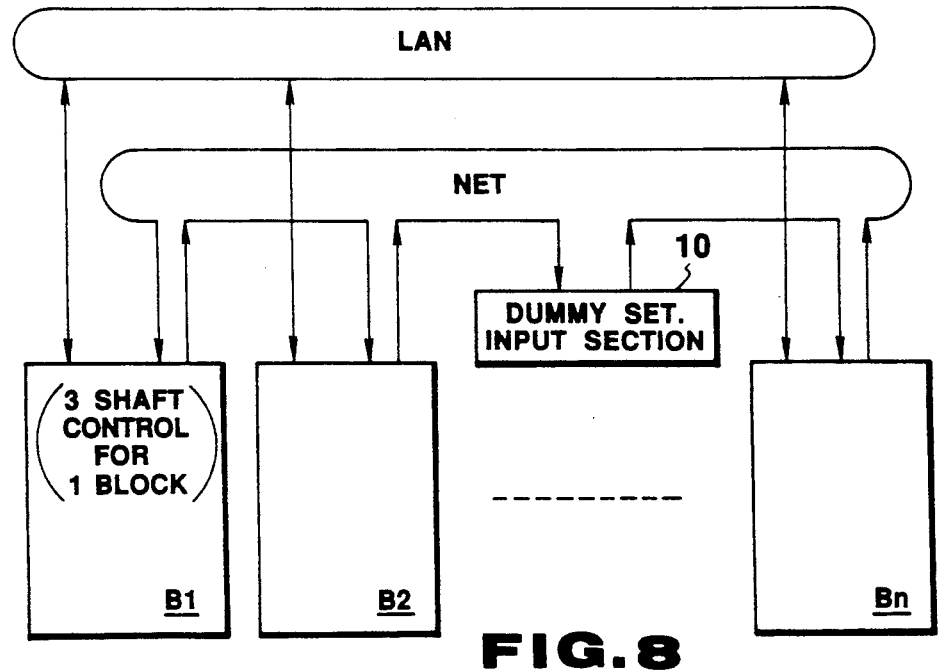
FIG. 8 is a block diagram schematically showing a construction in which a plurality of three-shaft synchronization control blocks as shown in FIGS. 5A and 5B are provided.

As schematically shown in FIG. 8, blocks shown in FIGS. 5A and 5B are provided as blocks B1 to Bn. While a synchronization control can be made independently in each block, the reference parameter can be generated through the above described annular communication network NET and a harmonization control is made so that each shaft in each block will attain a common position loop gain. Further, in the same manner as described before, a dummy setting input section 10 may be inserted in the annular communication network NET as the intervention means for manual intervention.

By the provision of the annular communication network NET in the construction for generating the reference parameter, the processing in the case of increasing a block is remarkably facilitated. That is, it will suffice if the harmonization input and output section 23 of a block to be additionally provided is inserted somewhere in the annular communication network NET. This advantage in the case of increase of a block can also be obtained in the embodiment of FIG. 4.

In FIG. 5A, a synchronization condition input section 25 in an external input and output unit 22 is provided for receiving data designating the synchronization condition of the synchronization control to be executed in the synchronization control operation unit 12 from the higher control device or input and output terminal devices. A command execution unit 26 is provided for generating various commands and data for controlling the entire operation in this block. An LAN-IF unit 27 is an interface of an LAN (local area network) for exchanging information between the higher control device and input and output terminal devices.

It is not necessary to perform a common harmonization control throughout all blocks of the system but a harmonization control may be made individually for each of plural groups.

For this purpose, in the system of FIG. 8, for example, the blocks B1 to Bn may be divided into several groups each including one or more blocks. In generating the reference parameter, the reference parameter may be generated for each group in response to a parameter representing a representative position loop gain of the blocks belonging to the particular group. In correcting the position loop gain, position loop gains of respective shafts in the blocks belonging to the particular group may be respectively corrected or changed in response to the reference parameter of the particular group.

Figure 9:
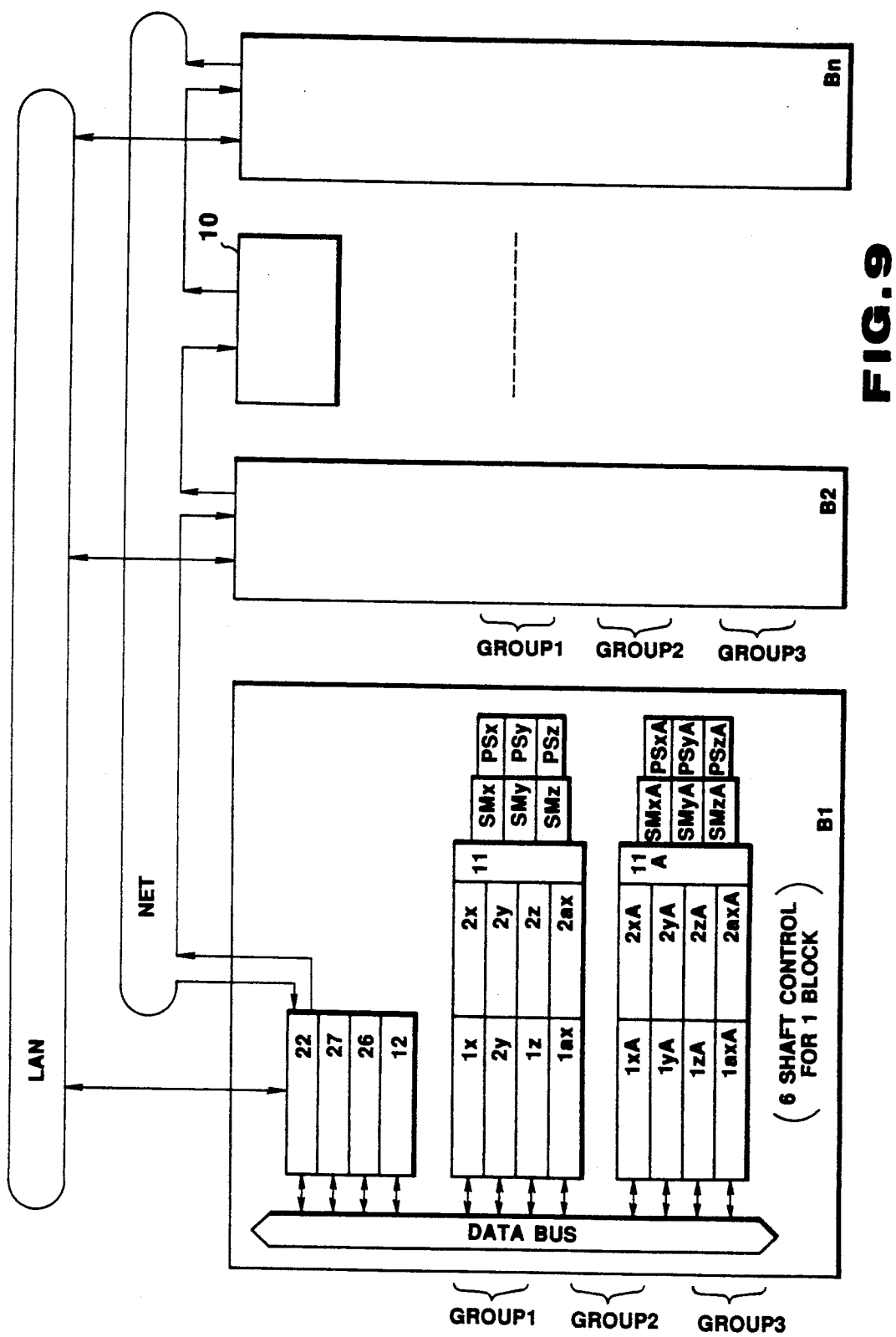
FIG. 9 is a block diagram showing still another embodiment of the invention.

Alternatively, the harmonization control on the group basis may be made by constructing a system as shown in FIG. 9.

In FIG. 9, one block can include six drive shafts and one block can be divided into groups of a predetermined number m, a synchronization control being made individually for each group in the block. In the hardware construction, this system has a construction in which servo motors SMxA, SMyA, SMzA and position sensors PSxA, PSyA, PSzA corresponding to three drive shafts, four position-velocity loop units 1xA, 1yA, 1zA, 1axA and four current amplifier units 2xA, 2yA, 2zand 2axA and a switching unit 11A are added to the construction of one block in FIGS. 5A and 5B. A higher control device or an external input and output terminal devices perform a function of group setting means for dividing one block into group of a predetermined number m (e.g., m=3) each group including 0 to plural shafts and setting a combination of shafts belonging to each group as desired. The group setting information of this group setting means is applied to a synchronization condition input section 25 of an external input and output unit 22 through the LAN. The synchronization control operation unit 12 has a function of receiving the group setting information applied from the synchronization condition input section 25 and dividing shafts into groups. In other words, the synchronization control operation unit 12 can perform synchronization control for each group in accordance with individual synchronization condition. Such type of control system capable of setting and changing a combination of shafts which are objects of a synchronization control is disclosed in detail in the above mentioned Japanese Patent Application No. 1-216136 (U.S. Patent Application Serial No. 07/565,268 and European Patent Application No. 90,115,209.0).

Assuming, for example, that shafts 1 to 6 correspond to the servo motors SMx, SMy, SMz, SMxA, SMyA and SMzA, these shafts 1 to 6 can be divided into three groups at the maximum depending upon the purpose of control and a synchronization control can be made in each of these groups. In a case where, for example, a three-dimensional locus control by three shafts is to be made by two sets of shafts, the shafts 1 to 3 are allotted to group 1 and the shafts 4 to 6 are allotted to group 2 and no allocation of shafts is made for group 3. For another example, in a case where a three-dimensional locus control by three shafts is to be made by one set of shafts, a two-dimensional locus control by one set of shafts and the remaining one shaft is to be controlled by itself, the shafts 1 to 3 are allotted to group 1, the shafts 4 and 5 are allotted to group 2 and the shaft 6 is allotted to group 3. Thus, any desired grouping may be made.

The synchronization control unit 12 performs necessary vector analysis operation for each of the set groups and thereby computes the movement pattern of each shaft and performs the synchronization control individually for each group.

As for the state parameter generation processing by the external input and output unit 22, a processing similar to the processing in FIG. 6 is made with respect to each group of the particular block, i.e., a parameter representing a representative drive control state, i.e., position loop gain, is generated for each group in the particular block. For generating the reference parameter, a processing similar to the processing in FIG. 7 utilizing the communication network NET is made for each group to generate a reference parameter for each group of the m=3 groups. More specifically, a processing for generating the reference parameter is made among groups 1 of the blocks B1 to Bn and a processing for generating the reference parameter is made among groups 2 and also among groups 3.

In this manner, the harmonization control can be achieved for each of groups.

For example, in a case where there are 40 blocks and one block includes six shafts, a harmonization control of 240 shafts can be realized.

When the harmonization control is made for each group as in the case of FIG. 9, the manual intervention by the dummy setting and inputting section 10 can of course be made for each group. Further, the dummy setting and inputting section 10 may set and input not only the dummy parameter SPd for each group but data for setting and changing the combination of shafts to be harmoniously controlled. In this case, the dummy setting and inputting section 10 may provide, for example, data set of "data section", "function code" and "group number code" to the communication network NET. The "group number code" is a code identifying the group number, the "data section" is either the dummy parameter SPd or data setting the combination of the shafts to be harmoniously controlled in the particular group, and the "function code" is a code representing which of the dummy parameter SPd or the data setting the combination of the shafts to be harmoniously controlled is being provided.

It is also possible to release the above described harmonization control for each group so as to allow manual intervention for each shaft. In this case, the dummy setting and inputting section 10 can select a mode in which the dummy parameter, i.e., command value, can be set and input individually for each shaft. When this mode has been selected, the format of data set provided to the communication network NET consist of "data section", "correction object code", "shaft number code" and "block number code". The "block number code" is a code identifying each shaft in the particular block. The "data section" is the dummy parameter, i.e., command value, which is position command data or velocity command data depending upon the object of correction by manual intervention. The "correction object code" is a code representing what type of data the data provided as the "data section" is (whether the data is position command data or velocity command data). In a case where, for example, position command data of the shaft x in block B1 is to be corrected compulsorily by manual intervention, desired position command data is supplied as the "data section", a code representing that the object of correction is position command data is supplied as the "correction object code" and codes representing the shaft x and the block B1 are supplied as the "shaft number code" and the "block number code".

The harmonization control may be performed with respect to a part of groups and the harmonization control may be released and manual intervention of a command value for each shaft may be made with respect to other groups.

The object of the harmonization control according to the invention is not limited to position or velocity but it may be other factors including acceleration time and/or deceleration time.

Figure 10A:
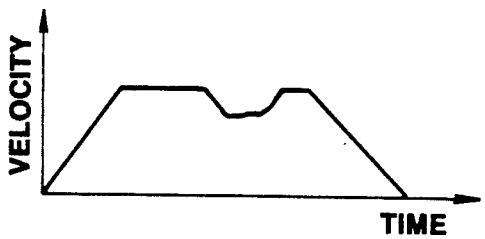
FIGS. 10A and 10B are graphs showing an example of the harmonization control according to the invention.
Figure 10B:
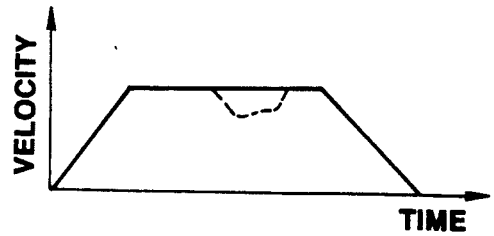

FIGS. 10A and 10B are graphs showing an example of the harmonization control according to the invention with respect to a velocity harmonization control. These graphs show velocity-time characteristics. Assume, for example, that velocity in a certain shaft has been subjected to a large variation as shown in FIG. 10A during a constant velocity control due to variation in the load condition or the like factor. In this case, another shaft during the constant velocity control can depict a constant velocity locus as shown by a solid line in FIG. 10B without any problem. If the drive control state of the shaft of FIG. 10A has been selected as the reference parameter, the other shaft will follow the variation of FIG. 10A as shown by a dotted line in FIG. 10B whereby the harmonization control is made.

As described in the foregoing, according to the invention, the reference parameter is generated in response to the drive control state of each shaft and the drive control state of each shaft is corrected in response to this reference character, so that the invention is advantageous in that a complicated and cumbersome processing program such as subjecting a multi-dimensional locus of movement to vector analysis for each shaft to compute an expected movement pattern for each shaft as in the synchronization control becomes unnecessary. Accordingly, a harmonization control can be performed very easily even in a case where the number of shafts to be harmoniously controlled is very large, e.g., several hundreds.

Besides, even when the drive control state of each shaft varies due to timewise variation in the load condition of the shaft or difference in the load condition among the shafts, the reference parameter which is generated in response to the drive control state of each shaft varies suitably in accordance with the variation in the drive control state and, accordingly, an optimum harmonization control can be constantly performed.

By carrying out the harmonization control system according to the invention in combination with the synchronization control, the drive shafts which amounts to a large number as a whole can be controlled harmoniously while they are controlled synchronously on the block basis whereby the harmonization control of a large number of shafts amounting even to several hundreds as a whole can be achieved while a multidimensional movement locus control can be performed on the block basis.

Further, according to the invention, by providing the intervention means for inputting the dummy parameter, the harmonization control can be made in response to the dummy parameter whereby the manual intervention to the system can be realized. This is particularly useful when a desired harmonized state should be realized immediately.

Furthermore, according to the invention, by providing a spare drive control unit for backup purposes, a drive control unit in which malfunction has occurred during use thereof can be separated by switching operation of the switching circuit and the spare drive control unit can immediately be connected to the system, so that the control can be continued without trouble.

What is claimed is:

1. A harmonization control system for plural shafts comprising:
   plural drive shafts;
   drive control units each provided for one of the drive shafts for controlling driving of the drive shaft in response to an individually imparted set value;
   state parameter generation means for generating, for each of the drive shafts, a parameter representing a state concerning a predetermined object of harmonization control among drive control states of the respective shafts produced by the drive control units;
   reference parameter generation means for generating, responsive to the parameter representing the drive control state of each drive shaft generated by the state parameter generation means, a reference parameter to be used as a reference of the harmonization control; and
   correction means for correcting the drive control state of each drive shaft in each of the drive control units in response to the reference parameter,
   the respective drive shafts being harmoniously controlled in response to the reference parameter owing to this correction.

2. A harmonization control system for plural shafts as defined in claim 1 wherein said drive control unit is a servo control unit and said state parameter generation means detects a current value of loop gain in the servo control unit and provides data corresponding to the detected loop gain as the parameter representing the drive control state concerning the predetermined object of harmonization control.

3. A harmonization control system for plural shafts as defined in claim 2 wherein said loop gain is a position loop gain and said correction means adjusts the position loop gain in said servo control unit.

4. A harmonization control system for plural shafts as defined in claim 3 wherein said state parameter generation means computes, as a position loop difference, difference between position command data and position feedback amount in said servo control unit, detects a current value of the position loop gain by operating current velocity with the position loop difference and provides the detected current value as said parameter.

5. A harmonization control system for plural shafts as defined in claim 2 wherein said loop gain is velocity loop gain and said correction means adjusts the velocity loop gain in said servo control unit.

6. A harmonization control system for plural shafts as defined in claim 1 wherein said reference parameter generation means selects one parameter from among parameters representing drive control states of the respective shafts in accordance with a predetermined reference and provides the selected parameter as the reference parameter.

7. A harmonization control system for plural shafts as defined in claim 6 wherein said reference parameter generation means selects a parameter of a maximum or minimum value and provides the selected parameter as the reference parameter.

8. A harmonization control system for plural shafts as defined in claim 1 wherein said reference parameter generation means performs a predetermined operation using the parameters representing the drive control states of the respective shafts as variables and provides result of the operation as the reference parameter.

9. A harmonization control system for plural shafts as defined in claim 8 wherein said operation is an operation for obtaining an average value.

10. A harmonization control system for plural shafts as defined in claim 1 wherein said reference parameter generation means comprises an annular communication network and input and output means connected serially to said communication network, and said input and output means inputs the parameter representing the drive control state of the corresponding shaft from the state parameter generation means of said corresponding shaft and also inputs data from said communication network, selectively performs one of selection of either of the two inputs, addition and subtraction thereof, and provides result of the processing to said communication network.

11. A harmonization control system for plural shafts as defined in claim 1 wherein said predetermined object of harmonization control is at least one of acceleration time and deceleration time.

12. A harmonization control system for plural shafts comprising:
 plural drive shafts;
 drive control units each provided for one of the drive shafts for controlling driving of the drive shaft in response to an individually imparted set value;
 state parameter generation means for generating, for each of the drive shafts, a parameter representing a state concerning a predetermined object of harmonization control among drive control states of the respective shafts produced by the drive control units;
 reference parameter generation means for generating, responsive to the parameter representing the drive control state of each drive shaft generated by the state parameter generation means, a reference parameter to be used as a reference of the harmonization control;
 correction means for correcting the drive control state of each drive shaft in each of the drive control units in response to the reference parameter; and
 intervention means for inputting a parameter of a desired value as a dummy parameter and said reference parameter generation means generates the reference parameter in response to the parameters representing the drive control states of the respective shafts generated by said state parameter generation means and the dummy parameter input by said intervention means;
 the respective drive shafts being harmoniously controlled in response to the reference parameter owing to this correction.

13. A harmonization control system for plural shafts as defined in claim 12 wherein said reference parameter generation means preferentially selects and outputs the dummy parameter as the reference parameter when said dummy parameter has been input by said intervention means.

14. A harmonization control system for plural shafts wherein the plural shafts are divided in blocks each including one or more drive shafts and
 (a) said system comprises, for each block,
  (a-1) a drive control unit provided for each shaft in said block for controlling driving of each shaft in response to an individually imparted set value;
  (a-2) a synchronization control unit for controlling the set value imparted to each drive control unit so that movements of the respective shafts are synchronized in accordance with a predetermined synchronization condition; and
  (a-3) state parameter generation means for generating a parameter representing a representative drive control state concerning a predetermined object of harmonization control in said block,
 (b) said system further comprises
  reference parameter generation means for generating, responsive to parameters representing representative drive control states in the respective blocks generated by said state parameter generation means, a reference parameter to be used as a reference of the harmonization control, and
 (c) said system further comprises, for each block,
  correction means for correcting the drive control states of the respective shafts in said block in response to the generated reference parameter,
  movements of the respective shafts being synchronously controlled by said synchronization control unit in one block and being harmoniously controlled among all of the blocks in response to the reference parameter by correction by said correction means.

15. A harmonization control system for plural shafts as defined in claim 14 wherein said state parameter generation means comprises first means for generating parameters representing states concerning a predetermined object of harmonization control among the drive control states of the respective shafts in said block, and second means for generating a parameter representing a representative shaft drive control state in said block.

16. A harmonization control system as defined in claim 15 wherein said second means selects, in accordance with a predetermined reference, one parameter from among the parameters representing the drive control states of the respective shafts and provides the selected parameter as the parameter representing a representative shaft drive control state.

17. A harmonization control system for plural shafts as defined in claim 15 wherein said second means performs a predetermined operation using the parameters representing the drive control states of the respective shafts as variables and provides result of the operation as the parameter representing a representative shaft drive control state.

18. A harmonization control system for plural shafts as defined in claim 14 wherein said reference parameter generation means selects, in accordance with a predetermined reference, one parameter from among the parameters representing representative shaft drive control states of the respective blocks and provides the selected parameter as the reference parameter.

19. A harmonization control system for plural shafts as defined in claim 14 wherein said reference parameter generation means performs a predetermined operation using the parameters representing representative shaft drive control states of the respective blocks as variables and provides result of the operation as the reference parameter.

20. A harmonization control system for plural shafts as defined in claim 14 wherein said reference parameter generation means comprises an annular communication network and input and output means for the respective blocks connected serially to said communication network, and said input and output means inputs the parameter representing the representative drive control state of the corresponding block from the state parameter generation means of said corresponding block and also inputs data from said communication network, selectively performs one of selection of either of the two inputs, addition and subtraction thereof, and provides result of the processing to said communication network.

21. A harmonization control system for plural shafts as defined in claim 14 which further comprises intervention means for inputting a parameter of a desired value as a dummy parameter and said reference parameter generation means generates the reference parameter in response to the parameters representing the representative drive control states of the respective blocks generated by said state parameter generation means and the dummy parameter input by said intervention means.

22. A harmonization control system for plural shafts as defined in claim 21 wherein said reference parameter generation means preferentially selects and outputs the dummy parameter as the reference parameter when said dummy parameter has been input by said intervention means.

23. A harmonization control system for plural shafts as defined in claim 14 wherein
said blocks are divided in plural groups each including one or more blocks;
said reference parameter generation means generates, for each group, the reference parameter in response to the parameter representing the representative drive control state of the block which belongs to said group; and
said correction means corrects the drive control states of the respective shafts in said block belonging to said group in response to the reference parameters of the respective groups,
whereby the harmonization control can be performed for the respective groups.

24. A harmonization control system for plural shafts as defined in claim 14 which further comprises group setting means which can divide plural shafts belonging to each of the blocks into groups of a predetermined number m each group including 0, one or more shafts and determine a combination of shafts of each group as desired, and wherein
said synchronization control unit performs the synchronization control for each of the groups set by said group setting means in accordance with an individual synchronization condition;
said state parameter generation means generates the parameter representing a representative drive control state for each group of said block;
said reference parameter generation means generates the reference parameter for each of the m groups in response to the parameter representing a representative drive control state of each group generated in each block; and
said correction means corrects the drive control state of each shaft belonging to each group in each block in response to the reference parameter for said group,
whereby the harmonization control can be performed for the respective groups.

25. A harmonization control system for plural shafts as defined in claim 24 wherein said reference parameter generation means comprises an annular communication network and input and output means for the respective blocks connected serially to said communication network, and said input and output means inputs the parameter representing the representative drive control state of each group of the corresponding block from the state parameter generation means of said corresponding block and also inputs data from said communication network, selectively performs one of selection of either of the two inputs, addition and subtraction thereof, and provides result of the processing for each group as data of said group to said communication network.

26. A harmonization control system for plural shafts as defined in claim 14 wherein said synchronization control unit performs the synchronization control so that locuses of movements of the respective shafts will synchronize with each other.

27. A harmonization control system for plural shafts as defined in claim 14 wherein one block comprises said drive control units of a number n+a (where n and a are respectively integers 1 or over) which is larger than number n of the shafts in said block by a, comprises a switching circuit between these n+a drive control units and actuators corresponding to the n shafts, enables desired n drive control units by a selection signal and connects the n desired drive control units which have been enabled to the n actuators through said switching circuit.

* * * * *